United States Patent [19]

Adams

[11] Patent Number: 4,721,085
[45] Date of Patent: Jan. 26, 1988

[54] VARYING AREA FUEL SYSTEM FOR COMBUSTION ENGINE

[75] Inventor: William D. Adams, P. O. Box 461, Austell, Ga. 30001

[73] Assignees: William D. Adams; Karen M. Adams, both of Austell, Ga.

[21] Appl. No.: 746,951

[22] Filed: Jun. 20, 1985

Related U.S. Application Data

[63] Continuation-in-part of Ser. No. 455,002, Jan. 3, 1983, Pat. No. 4,524,744.

[51] Int. Cl.$^4$ .......................... F02D 9/08; F02D 41/34
[52] U.S. Cl. .................................... 123/442; 123/389; 123/393; 123/478
[58] Field of Search ............... 123/393, 472, 478, 389, 123/442

[56] References Cited

U.S. PATENT DOCUMENTS

| | | | |
|---|---|---|---|
| 1,462,945 | 7/1923 | Spiro | 123/393 |
| 2,426,740 | 9/1947 | Mock | 123/393 |
| 3,557,898 | 1/1971 | Emery et al. | 123/393 |
| 3,581,723 | 6/1971 | Scholl | 123/442 |
| 3,721,219 | 3/1973 | Mennesson | 123/472 |
| 3,990,412 | 11/1976 | Zechnall et al. | 123/478 |
| 3,991,727 | 11/1976 | Kawai et al. | 123/478 |
| 4,311,126 | 1/1982 | Cowles | 123/438 |

*Primary Examiner*—Andrew M. Dolinar

[57] ABSTRACT

A fuel injection apparatus in which a closed fuel circuit is pressurized, and the amount of fuel injected is determined by varying the area switching on/off time of a solenoid in the injector, thereby allowing variance in the area factor of the equation $Q=AV$; where $Q=$flow, $A=$area, $V=$velocity. Air intake by the engine is controlled in response to the aspiration conditions of the engine via intake and exhaust signals. The fuel injection apparatus includes a reservoir with a fixed level of fuel, and a low pressure pump which pumps fuel into a circuit containing a pressure relief valve splitting amounts between the reservoir and leaving an amount of fuel approximate to the engine's needs going on the electronic injectors. The basic control of the injector's on/-off time is governed by ohmic change of the oscillator input, which is controlled by the conventional accelerator pedal. Air valve movement is achieved when the intake vacuum conditions are sensed inside the cavity defined by the dome pot's wall and the air valve's sliding portions top resulting in an upward lift from the exhaust pressure as sensed through a pressure transducer.

8 Claims, 4 Drawing Figures

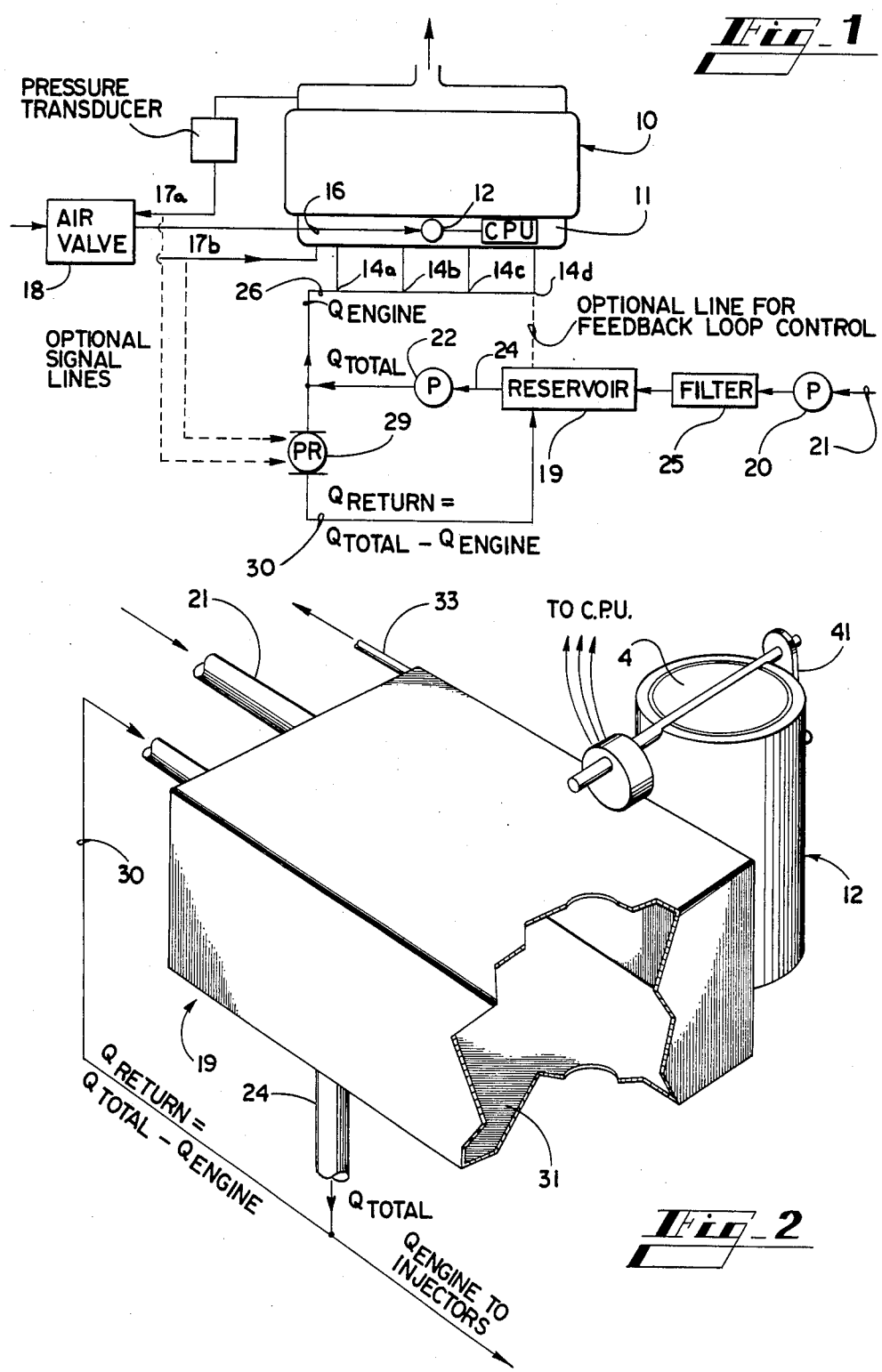

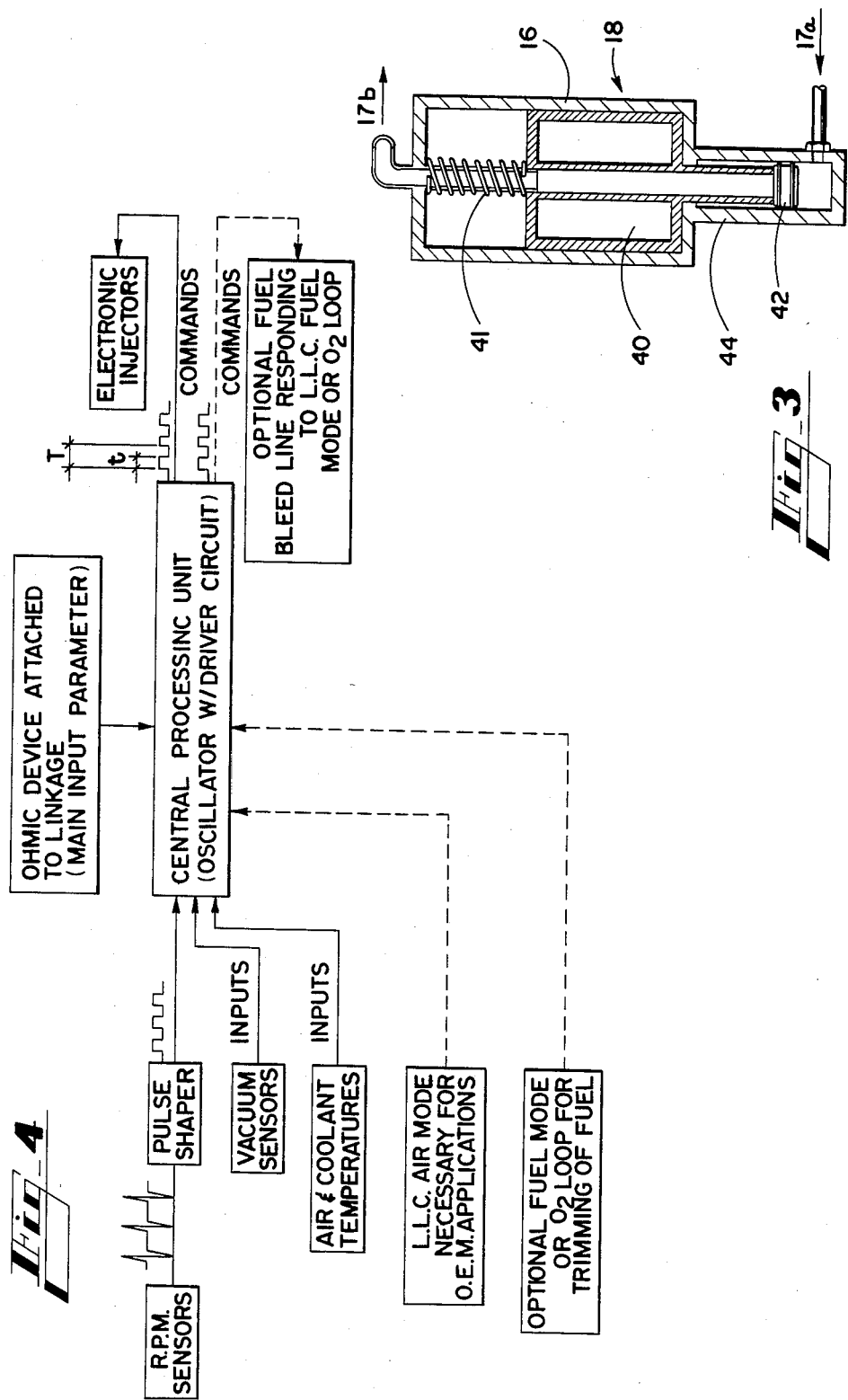

VARYING AREA FUEL SYSTEM FOR COMBUSTION ENGINE

CROSS REFERENCE TO RELATED APPLICATION

This application is a continuation in part of the previous application of the same inventor entitled "Fuel System for Combustion Engine," Ser. No. 455,002, filed Jan. 3, 1983, now U.S. Pat. No. 4,524,744.

INFORMATION DISCLOSURE STATEMENT

Various systems for controlling both the flow of fuel and the flow of air to an internal combustion engine have been known for a number of years. The primary control in the past has been through the use of a carburetor, and the modified systems have mostly taken the form of improved carburetion devices. Also the most frequent control system for an internal combustion engine includes the varying of air flow, such as with a butterfly valve, and controlling fuel flow in response to the amount of air flow. The inherent weaknesses of the carburetor as a fuel metering device for the future are well known to anyone reasonably skilled in the art of fuel modulation.

With the advent of environmental problems, it has been found that fuel injection systems tend to be superior to carburetor syetems in that better control of fuel is provided to achieve more nearly complete combustion, hence less pollution, and better mileage. Nevertheless, even with a fuel injection system, it is common to control the air flow by means of a butterfly valve or the like, and to vary the fuel flow on the basis of the modulated air flow. Many of the same problems therefore remain, and extremely complex systems have been devised in an effort to overcome such problems. Many of the fuel injection systems include sophisticated electronic controls, but the input to such electronics is derived from the somewhat conventional mechanical air flow devices.

It will therefore be understood that the prior art fuel and air controls for internal combustion engines have become more and more complex but have failed to solve the basic problems that are somewhat inherent in the four stroke cycle internal combution engine, namely matching the air/fuel ratio properly to meet all driving conditions, i.e. acceleration, idle, wide open throttle, etc.

SUMMARY OF THE INVENTION

This invention relates generally to fuel control systems for internal combustion engines, and is more particularly concerned with a fuel injection system wherein fuel flow is altered and air flow is modulated in response thereto.

The present invention overcomes the above-mentioned and other difficulties with the prior art by providing a fuel injection system utilizing the varying area principle, as opposed to the varying pressure/velocity method, for a conventional four stoke cycle internal combustion engine. The fuel injection system includes a fuel reservoir (or, the fuel tank could be utilized) with means for modulating the fuel flow allowed to pass through electronic injectors at the intake ports. $Q_{total}$ is the amount of fuel pumped from the reservoir into a tube containing a tee in which one line continues to the injectors, the other to a pressure regulator (constant or variable by intake/exhaust signals) by which excess fuel is returned to the reservoir. The sizing of the pressure regulator and the line is done such that a fuel amount $Q_{engine}$, approximately equal to engine requirements, heads toward the injectors, where linkage position controls an ohmic device that manipulates a self-exciting oscillator which in turn dictates what amount of fuel will pass through the nozzle. An optional return device such as the Lean Limit Control (L.L.C.), U.S. Pat. No. 4,015,572, or an $O_2$ sensor to vary the fuel flow futher by utilizing "real data" input generated by ongoing engine events (such as flywheel teeth r.p.m. (i.e. L.L.C.) or oxygen content in the exhaust waste stream (i.e. $O_2$ sensor). These devices could be installed before or after the nozzles. Additional trimming inputs, such as r.p.m., vacuum, ambient and coolant temperatures can be utilized to tailor trim the fuel flow within a narrow band around the basic air/fuel ratio as dictated by the basic frequency output of the driver-controlled self-exciting oscillator. The same principle applies to the L.L.C. and $O_2$ loop. These input parameters would be designed as a feedback loop modifying the basic square wave frequency output of the oscillator. SAE paper number 780346 goes into various input parameters in terms of fuel flow divided by r.p.m. to achieve a fueling factor range within which the engine must be maintained in order to avoid situations such as flooding.

A Bosch publication entitled "Electronically Controlled Fuel Injection Manifold Pressure sensitive (EFI-D) and Air Flow Sensitive (EFI-L)" is a manual that would be useful in understanding the basic electronics involved in forming a system.

Since this principle does not have a large varying pressure range, an air valve utilizing other input parameters such as intake to exhaust signal pressure ratio sensors is necessary to effect the desired basic air flow amount. An L.L.C. device, of the air mode type, could be used to tailor trim the air flow amounts to the fuel flows being dictated by the driver's foot pedal positions, thereby further tailoring the basic air valve supply.

A distinct advantage of varying the area over varying pressure is lower and fairly constant operating pressures (i.e. 40 psi and below) with no significant loss of fuel control, whereas with varying pressure, the upper pressure limit is the key to broader/finer fuel control.

BRIEF DESCRIPTION OF THE DRAWINGS

These and other features and advantages of the present invention will become apparent from consideration of the following specification when taken in conjunction with the accompanying drawings, in which:

FIG. 1 is a schematic view showing the fuel injection system of the present invention along with the air control system;

FIG. 2 is a perspective view, partially in cross-section, showing the fuel reservoir, ohmic variation device and butterfly shaft;

FIG. 3 is a cross-sectional view showing one form of air control valve for use in the system shown in FIG. 1; and, FIG. 4 is a block diagram showing the various inputs to the Central Processing Unit and the outputs to the injectors and L.L.C. and/or $O_2$ loop.

DESCRIPTION OF THE PREFERRED EMBODIMENT

Referring now more particularly to the drawing and to that embodiment of the invention here presented by way of illustration, it will be seen in FIG. 1 of the drawings that there is an engine represented at 10 having an intake manifold 11 with an air inlet indicated at 12.

The fuel injection means are shown simply as arrows at 14, and are designated as 14a, 14b, 14c, and 14d. These injection means are in communication with a common feed line 26. As a result, when fuel is pumped into feed line 26 at a certain pressure dictated by the pressure regulator 29, and the frequency and pulse width supplied by the oscillators to the injectors, injection of fuel is achieved.

It should be noted that in this embodiment the nozzles 14a, 14b, 14c, and 14d are located at the intake port and utilize electric solenoids to vary fuel flow by frequency and length of time of being energized.

Air is directed into the engine by admitting air through the inlet 12 from the duct indicated at 16. In this embodiment the butterfly 4 used to control fuel flow is used in a dual role assisting in air control as well, but an air valve such as 18 should be used regardless.

Fuel flow is controlled directly by the linkage 41 which rotates the potentiometer thereby varying the ohmic input to the basic oscillator circuit, resulting in modified frequency and pulse width energized times, causing a change in fuel flow through the nozzles. The fuel injection pump 22 pumps fuel flow, $Q_{total}$, out of reservoir 19 via line 24 to pressure regulator 29, where a flow roughly equal to the engine requirements, $Q_{engine}$, is diverted by sizing pressure regulator 29 such that the majority of $Q_{total}$ returns to the reservoir 19 as excess.

Once the fuel flow, $Q_{total}$, is split into the two subcomponents, $Q_{engine}$ and $Q_{returned}$, $Q_{engine}$ continues on to the injectors.

In order to facilitate meeting O.E.M. requirements of emissions and mileage, a device such as a fuel mode embodiment of the L.L.C. device or an $O_2$ sensor such as an emission performance device can be installed before or after nozzles 14a–d, which can trim the air/fuel ratio more precisely.

The above description describes the fuel loop being controlled by the driver directly via linkage 41, as shown in FIG. 2, or through a series of gears, levers or devices to magnify the operating range. Luckily with a butterfly 4 controlling air (crudely) entering the intake throat 12, air is partially metered, but an air valve 18 is still needed to slow down and meter incoming air so the desired air/fuel ratio can be maintained. The butterfly 4 alone is not sufficient to correlate air flow allowed to enter 12, to the fuel metered. A device such as air valve 18, shown in FIG. 3, must be utilized to loop air flow to fuel flow. Air valve 18 uses a simple pressure ratio sensor to control the upward movement of the valve by coupling intake vaccum demands via line 17b and the exaust gas stream via 17a. The exhaust gas stream contains a transducer utilizing a water-filled tank to transmit increased exhaust pressure, effecting an upward movement in the piston 42 with uplift provided via line 17b sensing vacuum conditions in the intake 11. For O.E.M. fine tuning an air modulation mode of the L.L.C. device may be necessary to supplement air valve 18 in maintaining the correct air/fuel ratio.

Operation of valve 18 takes place as follows:

At idle, low vacuum will be sensed above the air valve, and low exhaust pressure at the piston; therefore minimal lift occurs.

At part throttle, stronger vacuum will occur with stronger exhaust pressure; therefore intermediate lift occurs.

At wide open throttle, large vacuum signals coupled with a large exhaust pressure will cause maximum air valve lift.

At load condition, low vacuum but high exhaust pressure will cause a less than maximum but more than idle air valve lift, resulting in richer air/fuel ratios.

FIG. 4 depicts a basic schematic of the input/output signals to the Central Processing Unit (C.P.U.). The C.P.U. is a microprocessor possessing an oscillator based on 555 timers, Voltage Controlled Oscillators (V.C.O.), phase locked loop circuits or even a function generator containing a square wave signal output along with a frequency divider. The driver circuit can be composed of Darlington pairs, FETs or other suitable power devices.

Depending on an orifice size of nozzle, size of engine, and fuel requirements, the possible range of frequency could vary from a fraction of hertz to 60 hertz or more. Bear in mind that the vacuum signal will be impacting to pulse width $t_1$, time period, T, and the duty cycle, $t_1/T$, of the square wave; whereas the r.p.m. (after pulse shaping) signal will impact the basic frequency output. Cold start, warmup, and heat soak conditions can be addressed through additional oscillator branch circuits by utilizing ambient air and coolant temperature inputs.

The L.L.C. fuel mode and $O_2$ loop could inpact both frequency and pulse width of the C.P.U. output depending on the device's design, or act through a bleed-off injector.

The L.L.C. air mode system would be totally separate from the square wave output of the C.P.U., and is the subject of several S.A.E. papers, in particular those by Leshner, 870039 and 800265.

As additional fuel enrichment for some vehicles, an intake/ exhaust pressure signal coupled to the pressure regulator may be necessary to induce a slight increase in pressure, thereby metering more fuel faster.

Certain engine inputs are necessary to modulate the basic fuel flow within a certain narrow range to avoid flooding. The Lean Limit Control air mode, coupled with the air valve can manipulate the air flow if the basic fuel flow remains within a defined range, because the L.L.C. cannot differentiate between misfire caused by too-lean or too-rich conditions. Coupling the butterfly to the ohmic device establishes a basic air/fuel ratio helping to avoid a too-lean or too-rich ratio. Some systems may require an $O_2$ loop to keep the air/fuel ratio inside a particular range; then the L.L.C. can trim the ratio very closely from that point. Consistent with this thought, the r.p.m. parameter is the most important in terms of preventing flooding; therefore a mechanically driven fuel pump may be desirable for some systems, in order to link fuel pump output to engine speed.

The main air flow mainpulation occurs at the air valve where intake signals are sensed inside the cavity defined by the dome pot and the sliding valve top, resulting in an upward lift, and the exhaust pressure is sensed through a pressure transducer contributing to the upward push.

This system allows for a progressive fuel management control which eliminates the acceleration/deceleration problems depicted in Donald L. Stivender's paper named "Engine Air Control—Basis of a Vehicular Systems Control Hierarchy", S.A.E. Number 780346. Mr. Stivender conducted his research at General Motors Research Lab.

It will be understood that the embodiment of the invention presented is be way of illustration only, and changes and modifications may be made without departing from the scope of the invention as defined in the appended claims.

I claim:

1. Fuel injection apparatus for a spark ignition internal combustion engine having at least one cylinder and an air inlet, an injection nozzle for injecting fuel into said cylinder, a fuel feed line for supplying fuel under pressure to said injection nozzle, said fuel feed line being one leg of a return fuel circuit, said fuel circuit further including a fuel reservoir, a pump for pumping fuel from said reservoir and for creating pressure in said fuel feed line, a pressure relief valve communicating with said fuel circuit for maintaining a predetermined pressure, valve means connected in said fuel circuit between said fuel feed line and said nozzle for controlling the amount of fuel to said nozzle, driver controlled throttle valve means in said air inlet, means for controlling said fuel circuit valve means so that the amount of fuel is at least partially directly related to the position of said throttle valve means, an air valve upstream of said throttle valve means for controlling air flow to said air inlet, and means for opening said air valve in reponse to increased air demand by said engine, the amount of fuel and the position of said air valve being controlled independently of each other.

2. Fuel injection apparatus as claimed in claim 1, said fuel reservoir comprising a generally closed container, means for placing fuel into said container, conduit means connected to the bottom of said container and to said pump, a continuous return line having said pressure relief valve connected therein for returning excess fuel to said container, said fuel circuit valve means and controlling means comprising a solenoid, an oscillator for producing a signal, said solenoid receiving said signal from the oscillator, and means for modulating the frequency and pulse width of said signal based on driver dictates.

3. Fuel injection apparatus as claimed in claim 1, said engine further including an intake manifold and an exhaust manifold, said air valve being in communication with at least one of said intake and exhaust manifolds for causing said air valve to open.

4. Fuel injection apparatus as claimed in claim 3, and further including a transducer for receiving pressure from said exhaust manifold and utilizing such pressure for opening said air valve.

5. A method for operating an internal combustion engine including the steps of providing a reservoir of fuel for said engine, pumping said fuel from said reservoir through a fuel feed line to fuel injection nozzles having solenoids, said solenoids being operated by a singal including a plurality of pulses for providing varying times of energized on so that the amount of fuel injected through said nozzles varies with the change in frequency and pulse width of the signal to the solenoids, returning excess fuel to said reservoir by a return circuit connected to said fuel feed line, and varying the air supplied to said engine via a driver controlled throttle valve means and an air valve upstream of said throttle valve means, controlling said signal to the solenoids so that the amount of fuel is at least partially directly related to the position of said throttle valve means and independent of the position of said air valve and controlling the position of said air valve according to air demand by said engine independently of the position of said throttle valve means and said signal to the solenoids.

6. A method as claimed in claim 5, wherein the step of varying the air supplied to said engine includes the step of opening said air valve in response to increased exhaust pressure, and closing said air vale in response to decreased exhaust pressure.

7. A method as claimed in claim 5, wherein the step of varying the air supplied to said engine includes the step of opening said air valve in response to increased manifold vacuum, and closing said air valve in response to decreased manifold vacuum.

8. A method as claimed in claim 5, and further including the step of urging said air valve to open in response to increased manifold vacuum, and urging said air valve to close in response to decreased manifold vacuum.

* * * * *